United States Patent
Lee et al.

(10) Patent No.: US 8,254,016 B2
(45) Date of Patent: Aug. 28, 2012

(54) COLOR ELECTRONIC PAPER DISPLAY DEVICE AND METHOD FOR MANUFACTURING THE SAME

(75) Inventors: Young Woo Lee, Gyeonggi-do (KR); Sang Jin Kim, Gyeonggi-do (KR); Sang Moon Lee, Seoul (KR); Hwan Soo Lee, Gyeonggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 217 days.

(21) Appl. No.: 12/842,324

(22) Filed: Jul. 23, 2010

(65) Prior Publication Data

US 2011/0254427 A1    Oct. 20, 2011

(30) Foreign Application Priority Data

Apr. 19, 2010   (KR) .................... 10-2010-0035959

(51) Int. Cl.
G02B 26/00    (2006.01)

(52) U.S. Cl. ...................................... 359/296

(58) Field of Classification Search .................. 359/296; 345/107, 105; 204/600, 450; 430/32, 34, 430/38

See application file for complete search history.

(56) References Cited

U.S. PATENT DOCUMENTS 6,396,205 B1 * 5/2002 Sprague .................... 313/477 R
6,985,132 B2 * 1/2006 Nomura et al. ............... 345/107

FOREIGN PATENT DOCUMENTS

KR    10-0920233 B1    10/2009

* cited by examiner

*Primary Examiner* — Ricky Mack
*Assistant Examiner* — Tuyen Tra
(74) *Attorney, Agent, or Firm* — McDermott Will & Emery LLP

(57) ABSTRACT

Disclosed herein is a color electronic paper display device. The color electronic paper display device includes a barrier rib structure body that has a cavity partitioning rotating balls; and an electrode structure that is provided in the barrier rib structure body and applies voltage to the rotating balls, wherein the barrier rib structure body has a multilayer barrier rib structure formed of a lower barrier rib and an upper barrier rib, having different light absorptions.

28 Claims, 8 Drawing Sheets

COLOR ELECTRONIC PAPER DISPLAY DEVICE AND METHOD FOR MANUFACTURING THE SAME

CROSS REFERENCE TO RELATED APPLICATION

This application claims the benefit of Korean Patent Application No. 10-2010-0035959, filed on Apr. 19, 2010, entitled "Color Electronic Paper Display Device And Method For Manufacturing The Same", which is hereby incorporated by reference in its entirety into this application.

BACKGROUND OF THE INVENTION

1. Technical Field

The present invention relates to a color electronic paper display device and a method for manufacturing the same, and more particularly, to a color electronic paper display device that improves color sharpness and contrast ratio, and a method for manufacturing the same.

2. Description of the Related Art

Among next generation display devices, a color electronic paper display device has availability and flexibility larger than those of other display devices and is able to be driven with low power. Therefore, the color electronic paper display device can replace paper printed media such as books and can be applied to various kinds of fields, such as screens, electronic wall papers, and the like.

As a typical color electronic paper display device, there is a color electronic paper display device using rotating balls formed of hemispheres having different colors. The twist ball-type color electronic paper display device includes a plurality of rotating balls, a barrier rib structure body that partitions the rotating balls, an electrode structure that rotates the rotating balls, and transparent insulating oil that provides lubrication to the rotating balls. Herein, the hemispheres forming one rotating ball have different colors and are further electrified with different charges. Alternatively, only any one of the hemispheres may be selectively electrified with positive or negative charge.

Therefore, the electrode structure applies voltage to the rotating balls to rotate the rotating balls in order that any one of the hemispheres selectively faces the outside, thereby making it possible to represent color to the outside.

Meanwhile, when color is represented by any one of the hemispheres, color of the other hemisphere is prevented from being represented by the barrier rib structure body. However, while color is represented by any one of the hemispheres, color of the other hemisphere is also substantially represented to the outside. This phenomenon is generated as the color of the other hemisphere is represented when the light incident on the gap between the rotating balls and the barrier rib structure body is leaked again to the outside from the gap. As described above, when the color is represented by any one of hemispheres and the color of the other hemisphere is also represented, the color contrast ratio and sharpness of the color electronic paper display device is degraded.

SUMMARY OF THE INVENTION

An object of the present invention is to provide a color electronic paper display device that improves color sharpness and contrast ratio.

Another object of the present invention is to provide a method for manufacturing a color electronic paper display device that improves color sharpness and contrast ratio.

According to an exemplary embodiment of the present invention, there is provided a color electronic paper display device, including: a barrier rib structure body that has a cavity partitioning rotating balls; and an electrode structure that is provided in the barrier rib structure body and applies voltage to the rotating balls, wherein the barrier rib structure body has a multilayer barrier rib structure formed of a lower barrier rib and an upper barrier rib, having different light absorptions.

According to an exemplary embodiment of the present invention, the multilayer barrier rib structure may include a lower barrier rib, and an upper barrier rib that is disposed on the lower barrier rib and has a relatively higher light reflectance than that of the lower barrier rib.

According to an exemplary embodiment of the present invention, the lower barrier rib may include a light absorbing layer that absorbs light, and the upper barrier rib may include a light reflective layer that reflects the light.

According to an exemplary embodiment of the present invention, the lower barrier rib may include a pigment having a lower lightness than that of the upper barrier rib.

According to an exemplary embodiment of the present invention, each of the rotating balls may be configured of first and second hemispheres electrified with different charges, and the height of the boundary surface between the lower barrier rib and the upper barrier rib may be equal to or higher than the height of the boundary surface between the first and second hemispheres.

According to an exemplary embodiment of the present invention, each of the rotating balls may be configured of first and second hemispheres electrified with different charges, and the lower barrier rib may be configured to surround any one of the first and second hemispheres.

According to an exemplary embodiment of the present invention, each of the rotating balls may be configured of first and second hemispheres electrified with different charges, and the lower barrier rib may absorb the light reflected from any one of the first and second hemispheres and the upper barrier rib may reflect the light reflected from the other of the first and second hemispheres.

According to an exemplary embodiment of the present invention, the light absorbing layer may be formed by laminating a plurality of light absorbing films.

According to an exemplary embodiment of the present invention, there is provided a method for manufacturing a color electronic paper display device, including: forming a light absorbing layer; forming a light reflective layer on the light absorbing layer; forming a multilayer barrier rib structure having a lower barrier rib and an upper barrier rib by forming a cavity in the light reflective layer and the light absorbing layer; disposing rotating balls in the cavity; and forming an electrode structure that applies voltage to the rotating balls in the multilayer barrier rib structure.

According to an exemplary embodiment of the present invention, the method for manufacturing a color electronic paper display device may further include preparing a base substrate that supports the multilayer barrier rib structure, wherein the forming the light absorbing layer may include laminating a plurality of light absorbing films to the base substrate.

According to an exemplary embodiment of the present invention, the rotating balls may be formed of first and second hemispheres electrified with different charges, having different colors, and the disposing the rotating balls in the cavity may include positioning the rotating balls in the cavity so that the height of the boundary surface between the lower barrier rib and the upper barrier rib is equal to or higher than the height of the boundary surface between the first and second hemispheres.

According to an exemplary embodiment of the present invention, the rotating balls may be formed of first and second hemispheres electrified with different charges, having different colors, and the forming the light absorbing layer may control the relative thickness of the light absorbing layer and the light reflective layer so that the height of the boundary surface between the lower barrier rib and the upper barrier rib is equal to or higher than the height of the boundary surface between the first and second hemispheres.

According to an exemplary embodiment of the present invention, there is provided a color electronic paper display device, including: a barrier rib structure body that has a cavity partitioning rotating balls; and an electrode structure that is provided in the barrier rib structure body and applies voltage to the rotating balls, wherein the barrier rib structure body includes: a lower barrier rib; an upper barrier rib that is disposed on the lower barrier rib; and a light absorbing layer that covers the lower barrier rib exposed to the cavity and partially surrounds the rotating ball.

According to an exemplary embodiment of the present invention, the light absorbing layer may include a portion interposed between the lower barrier rib and the upper barrier rib.

According to an exemplary embodiment of the present invention, the light absorbing layer may include a pigment having a lower lightness than that of the lower barrier rib and the upper barrier rib.

According to an exemplary embodiment of the present invention, the upper barrier rib may be used as a light reflective layer that reflects light from the rotating balls to the outside.

According to an exemplary embodiment of the present invention, each of the rotating balls may be configured of hemispheres electrified with different charges, and the height of the boundary surface between the lower barrier rib and the upper barrier rib may be equal to or higher than the height of the boundary surface between the hemispheres.

According to an exemplary embodiment of the present invention, the lower barrier rib and the upper barrier rib may be made of the same material.

According to another exemplary embodiment of the present invention, there is provided a method for manufacturing a color electronic paper display device, including: forming a lower barrier rib that has a cavity partitioning rotating balls; forming a light absorbing layer that covers the lower barrier rib; forming an upper barrier rib that shares the cavity on the lower barrier rib other than the region where the cavity is formed; disposing rotating balls in the cavity; and forming an electrode structure that applies voltage to the rotating balls in a barrier rib structure body.

According to another exemplary embodiment of the present invention, the method for manufacturing a color electronic paper display device may further includes preparing a base substrate that supports the barrier rib structure body, wherein the forming the light absorbing layer may include laminating a plurality of light absorbing films to the lower barrier rib.

According to another exemplary embodiment of the present invention, the rotating balls may be formed of first and second hemispheres electrified with different charges, having different colors, and the disposing the rotating balls in the cavity may include positioning the rotating balls in the cavity so that the height of the boundary surface between the lower barrier rib and the upper barrier rib is equal to or higher than the height of the boundary surface between the first and second hemispheres.

According to another exemplary embodiment of the present invention, the rotating balls may be formed of first and second hemispheres electrified with different charges, having different colors, and the forming the light absorbing layer may control the region of the cavity, where the light absorbing layer is formed, so that the height of the boundary surface between the lower barrier rib and the upper barrier rib is equal to or higher than the height of the boundary surface between the first and second hemispheres.

According to another exemplary embodiment of the present invention, the lower barrier rib and the upper barrier rib may be made of the same material.

According to another exemplary embodiment of the present invention, there is provided a method for manufacturing a color electronic paper display device, including: forming a barrier rib structure having a cavity partitioning rotating balls; forming a light absorbing layer that covers the barrier rib structure; removing the light absorbing layer in the rest region of the cavity, while maintaining the light absorbing layer in the cavity; positioning the rotating balls in the cavity; and forming an electrode structure that applies voltage to the rotating balls.

According to another exemplary embodiment of the present invention, the forming the light absorbing layer may include laminating light absorbing films to the barrier rib structure.

According to another exemplary embodiment of the present invention, the removing the light absorbing layer may allow the lower side surface of the barrier rib structure in the cavity to be covered by the light absorbing layer and the upper side surface of the barrier rib structure to be exposed.

According to another exemplary embodiment of the present invention, the positioning the rotating balls in the cavity may include positioning the rotating balls in the cavity so that the height of the boundary surface between the light absorbing layer and the upper side surface of the cavity is equal to or higher than the height of the boundary surface between the first and second hemispheres.

According to another exemplary embodiment of the present invention, the rotating balls may be formed of first and second hemispheres electrified with different charges, having different colors, and the removing the light absorbing layer may define the region where the light absorbing layer is formed so that the light absorbing layer surrounds any one of the first and second hemispheres.

DESCRIPTION OF THE PREFERRED EMBODIMENTS

Various advantages and features of the present invention and methods accomplishing thereof will become apparent from the following description of embodiments with reference to the accompanying drawings. However, the present invention may be modified in many different forms and it should not be limited to the embodiments set forth herein. Rather, these embodiments may be provided so that this disclosure will be thorough and complete, and will fully convey the scope of the invention to those skilled in the art. Like reference numerals in the drawings denote like elements.

Terms used in the present specification are for explaining the embodiments rather than limiting the present invention. Unless explicitly described to the contrary, a singular form includes a plural form in the present specification. The word "comprise" and variations such as "comprises" or "comprising," will be understood to imply the inclusion of stated constituents, steps, operations and/or elements but not the exclusion of any other constituents, steps, operations and/or elements.

Hereinafter, a color electronic paper display device and a method for manufacturing the same according to an embodiment of the present invention will be described in detail with reference to the accompanying drawings.

Figure 1:
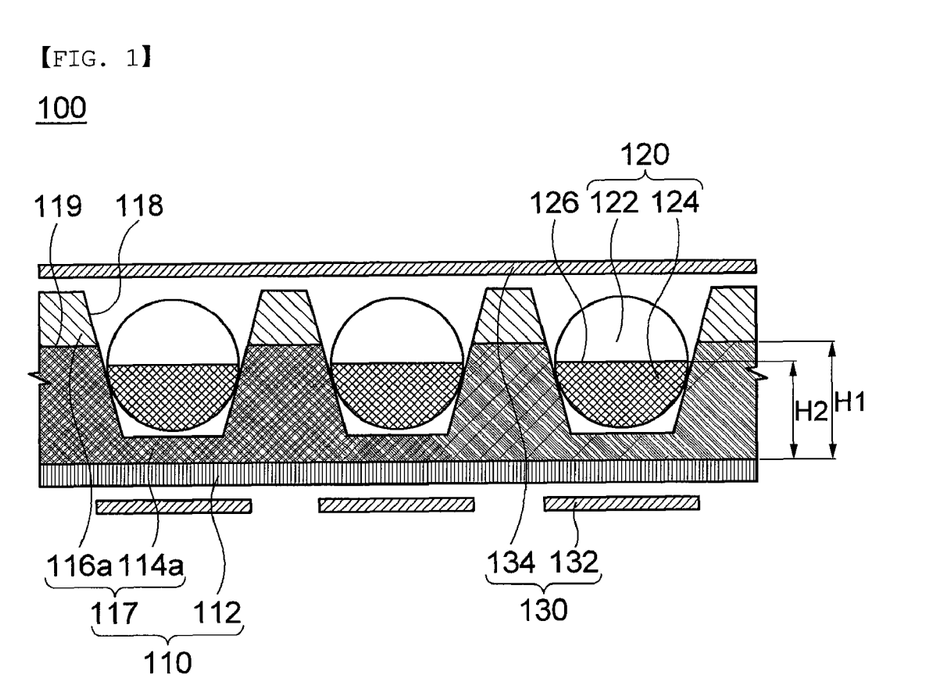
FIG. 1 is a diagram showing a color electronic paper display device according to an exemplary embodiment of the present invention.

FIG. 1 is a diagram showing a color electronic paper display device according to an exemplary embodiment of the present invention. Referring to FIG. 1, a color electronic paper display device 100 according to an embodiment of the present invention may include a barrier rib structure body 110, rotating balls 120, and an electrode structure 130.

The barrier rib structure body 110 may support and partition the rotating balls 120. The barrier rib structure body 110 may include a lower barrier rib 114a and an upper barrier rib 116a that is disposed on the lower barrier rib 114a. The lower barrier rib 114a and the upper barrier rib 116a may form a multilayer barrier rib structure 117. The lower barrier rib 114a and the upper barrier rib 116a may be provided with a groove defining a cavity 118. The cavity 118 may define a space where the rotating balls 120 are disposed. The rotating balls 120 may be partitioned from each other within the barrier rib structure body 110 by the cavity 118. Herein, the cavity 118 may be filled with transparent oil (not shown) for providing easy rotation of the rotating balls 120 and lubrication of the rotating balls 120.

Meanwhile, the barrier rib structure body 110 may further include a base substrate 112. The base substrate 112 supports the lower barrier rib 114a and the upper barrier rib 116a. In the present embodiment, the base substrate 112 is used as a supporter of the multilayer barrier rib structure 117 by way of example, but the electrode structure 130 may also be used as the supporter of the multilayer barrier rib structure 117. In this case, the base substrate 112 may not be provided.

The lower barrier rib 114a may have a relatively higher light absorption than that of the upper barrier rib 116a. For example, the lower barrier rib 114a may include a pigment having lower lightness than that of the upper barrier rib 116a. Carbon black may be used as the pigment. To the contrary, the upper barrier rib 116a may be configured to have a higher light reflectance than that of the lower barrier rib 114a. When representing the color of the rotating balls 120, the upper barrier rib 116a allows the light facing the upper barrier rib 116a to be effectively reflected to the outside, thereby making it possible to improve brightness of the color.

The rotating balls 120 may have a substantial sphere shape. The rotating balls 120 each may be formed of first and second hemispheres 122 and 124 that are electrified with different charges. In addition, the first and second hemispheres 122 and 124 may have different colors. For example, when the color electronic paper display device 100 is a white/black display device, the first hemisphere 122 may be a white hemisphere and the second hemisphere 124 may be a black hemisphere. As another example, when the color electronic paper display device is a color display device, the first hemisphere 122 may be any one of a blue hemisphere, a yellow hemisphere, a red hemisphere and a green hemisphere, and the second hemisphere 124 may be a black hemisphere or a white hemisphere. The colors of the first and second hemispheres 122 and 124 of each of the rotating balls 120 may be changed and combined in various manners.

The electrode structure 130 may rotate the rotating balls 120. For example, the electrode structure 130 may include a lower electrode 132 that is disposed under the barrier rib structure body 110 and an upper electrode 134 that is disposed over the barrier rib structure body 110. The lower and upper electrodes 132 and 134 selectively apply voltage to the rotating balls 120, thereby making it possible to rotate the rotating balls 120 in order that the hemisphere of the first and second hemispheres 122 and 124 having the color to be represented, faces the outside (the upper portion in FIG. 1).

Meanwhile, while any one of the first and second hemispheres 122 and 124 is positioned to face the upper portion, the barrier rib structure body 110 may be configured so that the other hemisphere facing the lower portion is completely surrounded by the lower barrier rib 114a. For example, a height H1 of a boundary surface (hereinafter, referred to as a 'first boundary': 119) between the lower barrier rib 114a and the upper barrier rib 116a may be equal to or higher than a height H2 of a boundary surface (hereinafter, referred to as a 'second boundary': 126) between the first and second hemispheres 122 and 124 of the rotating balls 120. In this case, as shown in FIG. 1, while the first hemisphere 122 represents color to the outside, the second hemisphere 124 is surrounded by the lower barrier rib 114a. At this time, the light reflected from the second hemisphere 124 may be absorbed by the lower barrier rib 114a. When the second hemisphere 124 represents color to the outside as the rotating balls 120 rotate, the first hemisphere 122 is surrounded by the lower barrier rib 114a. At this time, the light reflected from the first hemisphere 122 may be absorbed by the lower barrier rib 114a. Therefore, the barrier rib structure body 110 is configured so that the height H1 of the first boundary surface 119 is equal to or higher than the height H2 of the second boundary surface 126, thereby making it possible to prevent the color of the other hemisphere from being represented to the outside, while the color of any one of the first and second hemispheres 122 and 124 is represented.

In addition, while the first hemisphere 122 represents the color to the outside, the light reflected from the first hemisphere 122 to face the upper barrier rib 116a may be reflected by the upper barrier rib 116a to face the outside. Therefore, the upper barrier rib 116a is configured to have a high light reflectance, thereby making it possible to more improve brightness and sharpness when representing the color of the rotating balls 120.

As described above, the color electronic paper display device 100 according to the present invention includes the rotating balls 120 formed of the first and second hemispheres 122 and 124 having different colors and the barrier rib structure body 110 that partitions the rotating balls 120, wherein the barrier rib structure body 110 has the lower barrier rib 114a that is configured to cover the color of the other hemisphere and absorbs light, while the color of any one of the first and second hemispheres 122 and 124 is represented. Therefore, the color electronic paper display device 100 prevents the color of the other hemisphere from being represented by the light reflection of the barrier rib structure body 110, while the color is represented by any one of the hemispheres of the rotating balls 120, thereby making it possible to improve color sharpness and contrast ratio of the display device.

Continuously, a method for manufacturing a color electronic paper display device according to an embodiment of the present invention described above will be described in detail. Herein, a description overlapping with the color electronic paper display device 100 described above will be omitted or simplified.

Figure 2:
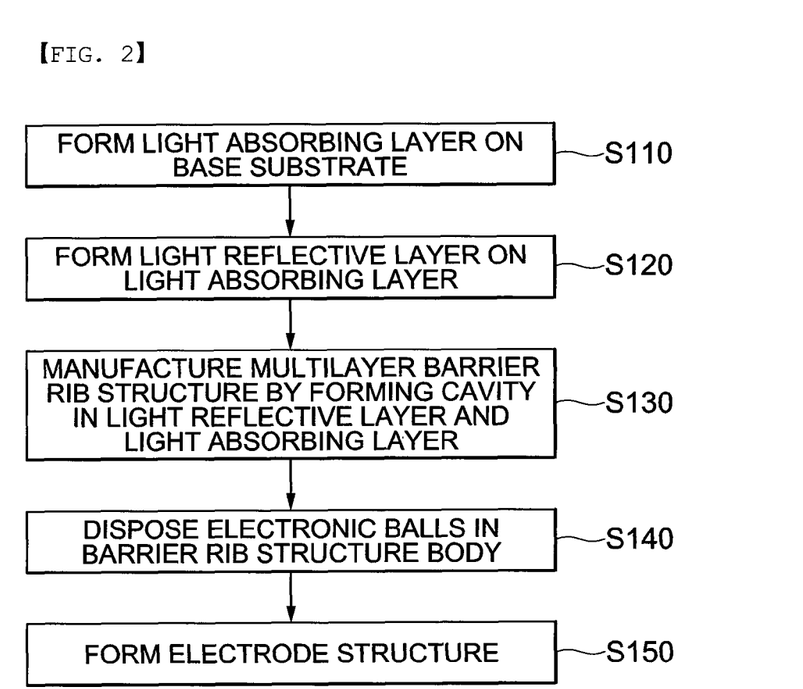
FIG. 2 is a flow chart showing a method for manufacturing a color electronic paper display device according to an embodiment of the present invention.
Figure 3A:
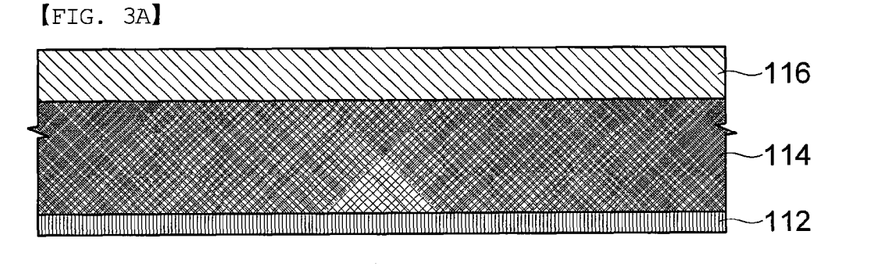
FIGS. 3A to 3C are diagrams explaining processes for manufacturing a color electronic paper display device according to an embodiment of the present invention.
Figure 3B:
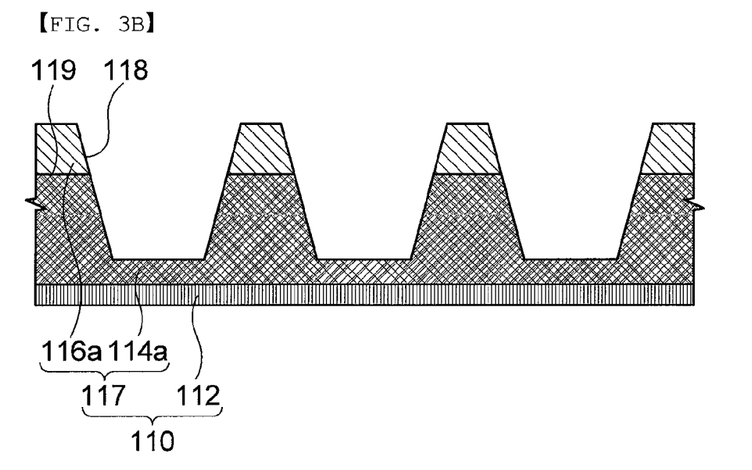
Figure 3C:
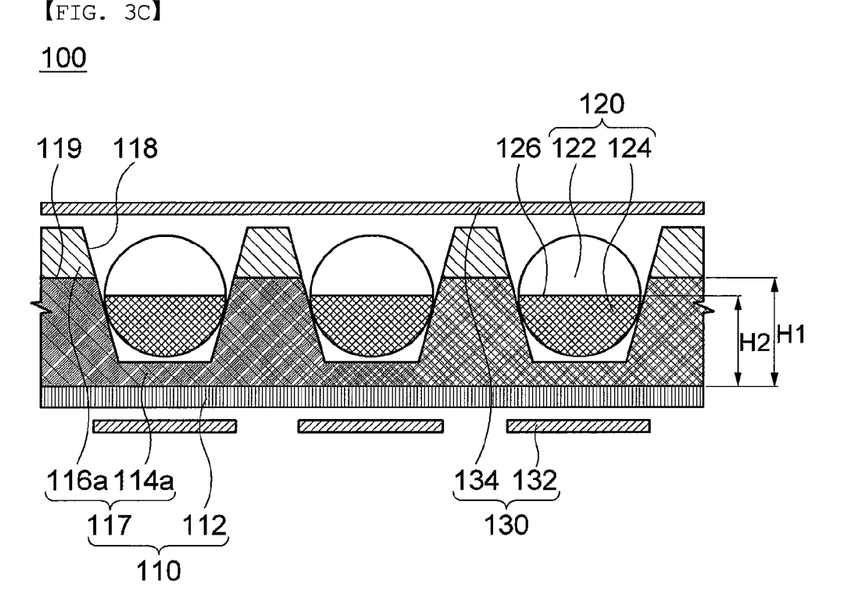

FIG. 2 is a flow chart showing a method for manufacturing a color electronic paper display device according to an embodiment of the present invention. FIGS. 3A to 3C are diagrams explaining processes for manufacturing a color electronic paper display device according to an embodiment of the present invention.

Referring to FIGS. 2 and 3A, a light absorbing layer 114 may be formed on a base substrate 112 (S110). The forming the light absorbing layer 114 may be made by performing a lamination process of attaching at least one light absorbing film having a relatively low lightness to the base substrate 112. The light absorbing film may be provided in plural. In this case, a plurality of light absorbing films are molded to be stacked on the base substrate 112, thereby making it possible to form the light absorbing layer 114. Herein, the entire light absorption of the light absorbing layer 114 may be controlled by changing the number of the light absorbing films or configuring the light absorbing film to absorb light of a specific wavelength.

A light reflective layer 116 may be formed on the light absorbing layer 114 (S120). The manufacturing the multilayer barrier rib structure 117 may be made by performing a lamination process of attaching a light reflection film having a higher light reflectance than that of the light absorbing film to the light absorbing layer 114. The light reflection film may be provided in plural. In this case, a plurality of light reflection films are molded to be stacked on the light absorbing films, thereby making it possible to form the light reflective layer 116. Herein, the entire light reflectivity of the light reflective layer 116 may be controlled by changing the number of the light reflection films or configuring the light reflection film to reflect light of a specific wavelength.

Referring to FIGS. 2 and 3B, the multilayer barrier rib structure 117 may be manufactured by forming the cavity 118 in the light reflective layer (116 in FIG. 3A) and the light absorbing layer (114 in FIG. 3A) (S310). For example, the forming the cavity 118 may be made by performing an etching process, the etching process sequentially etching the light reflective layer 116 and the light absorbing layer 114. The etching process may use a photolithography process, a laser processing process, a wet etching process or the like. Therefore, it is possible to manufacture the barrier rib structure body 110 including the base substrate 112 and the multilayer barrier rib structure 117 formed of the lower barrier rib 114a and the upper barrier rib 116a.

Referring to FIGS. 2 and 3C, the rotating balls 120 may be disposed in the barrier rib structure body 110 (S140). For example, the rotating balls 120 may be positioned in the cavity 118 of the barrier rib structure body 110. Herein, the rotating balls 120 may be disposed so that the height H2 of the second boundary surface 126 between the first and second hemispheres 122 and 124 of the rotating balls 120 is to be lower than the height H1 of the first boundary surface 119 between the lower barrier rib 114a and the upper barrier rib 116a of the barrier rib structure body 110. To this end, the relative thicknesses of the light absorbing layer 114 and the light reflective layer 116 are controlled during the process of forming the light absorbing layer 114 and the light reflective layer 116 described with reference to FIG. 3A, such that the height of the first boundary surface 119 may be controlled. In addition, in consideration of the diameter of the rotating balls 120 and the diameter of the cavity 118, the rotating balls 120 may be disposed so that the height H2 of the second boundary surface 126 is lower than the height H1 of the first boundary surface 119.

The electrode structure 130 may be formed in the barrier rib structure body 110 (S150). The forming the electrode structure 130 may include disposing the lower electrode 132 under the barrier rib structure body 110, and disposing the upper electrode 134 over the barrier rib structure body 110.

As described above, the method for manufacturing the color electronic paper display device according to the present invention can manufacture the color electronic paper display device including the rotating balls 120 formed of the first and second hemispheres 122 and 124 having different colors and the barrier rib structure body 110 that partitions the rotating balls 120, wherein the barrier rib structure body 110 has the lower barrier rib 114a that is configured to surround the other hemisphere and absorbs light reflected from the other hemisphere, while the color of any one of the first and second hemispheres 122 and 124 is represented. Therefore, the method for manufacturing the color electronic paper display device can manufacture the color electronic paper display device 100 that improves color sharpness and contrast ratio by preventing the color of the other hemisphere from being represented by the light reflection of the barrier rib structure body 110, while the color is represented by any one of the hemispheres of the rotating balls 120.

Hereinafter, a color electronic paper display device according to another embodiment of the present invention will be described in detail. Herein, a description overlapping with the technology relating to the color electronic paper display device according to an embodiment of the present invention described above will be omitted or simplified.

Figure 4:
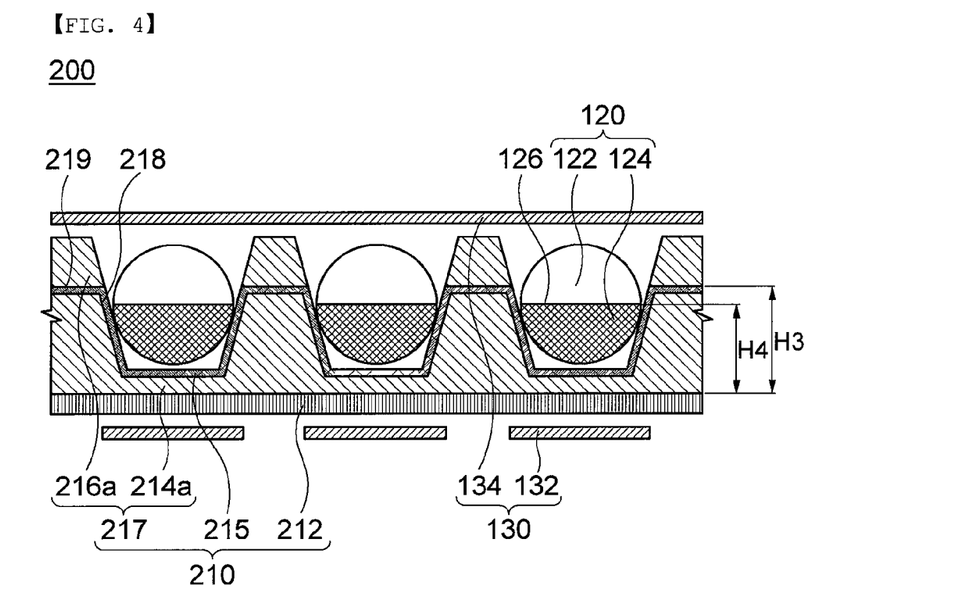
FIG. 4 is a diagram showing a color electronic paper display device according to another embodiment of the present invention.

FIG. 4 is a diagram showing a color electronic paper display device according to another embodiment of the present invention. Referring to FIG. 4, a color electronic paper display device 200 according to another embodiment of the present invention may include rotating balls 120, an electrode structure 130, and a barrier rib structure body 210. The rotating balls 120 and the electrode structure 130 are the same as those explained in an embodiment of the present invention described above, such that a detailed description thereof will be omitted.

The barrier rib structure body 210 may include a base substrate 212, a lower barrier rib 214a, a light absorbing layer 215, and an upper barrier rib 216a. The lower barrier rib 214a and the upper barrier rib 216a may be stacked on the base substrate 212 in sequence. The lower barrier rib 214a and the upper barrier rib 216a forms a multilayer barrier rib structure 217, wherein the multilayer barrier rib structure 217 may be provided with a cavity 218 that partitions the rotating balls 120. The light absorbing layer 215 may cover the lower barrier rib 214a. The light absorbing layer 215 in the region where the cavity 218 is not formed may be interposed between the lower barrier rib 214a and the upper barrier rib 216a.

Meanwhile, the light absorbing layer 215 may have a relatively higher light absorption than those of the upper barrier rib 214a and the upper barrier rib 216a of the multilayer barrier rib structure 217. For example, the light absorbing layer 215 may include a pigment having a relatively lower lightness than that of the multilayer barrier rib structure 217. In addition, the upper barrier rib 216a may be configured to have a relatively higher light reflectance. When color of the rotating balls 120 is represented, the upper barrier rib 116a can improve the brightness of the color.

While any one of the first and second hemispheres 122 and 124 is positioned to face the upper portion, the barrier rib structure body 210 having the above configuration may be configured so that the other hemisphere facing the lower portion is completely surrounded by the light absorbing layer 215. For example, a height H3 of a boundary surface (hereinafter, referred to as a 'third boundary': 219) between the lower barrier rib 214a and the upper barrier rib 216a may be equal to or higher than a height H4 of a boundary surface (hereinafter, referred to as a 'fourth boundary': 126) between the first and second hemispheres 122 and 124 of the rotating balls 120. Herein, the light absorbing layer 215 is provided to have a very thin film shape, such that the height H3 of the third boundary surface 219 may be substantially equal to the height of the upper surface of the light absorbing layer 215. In this case, as shown in FIG. 4, while the first hemisphere 122 represents color to the outside, the second hemisphere 124 is surrounded by the light absorbing layer 215. At this time, the light reflected from the second hemisphere 124 may be absorbed by the light absorbing layer 215. Therefore, the multilayer barrier rib structure 217 is configured so that the height H3 of the upper surface of the light absorbing layer 215 is equal to or higher than the height H4 of the second boundary surface 126, thereby making it possible to prevent the color of the other hemisphere from being represented to the outside, while the color of any one of the first and second hemispheres 122 and 124 is represented.

In addition, while the first hemisphere 122 represents the color to the outside, the light reflected from the first hemisphere 122 to face the upper barrier rib 216a may be reflected by the upper barrier rib 216a to face the outside. Therefore, the upper barrier rib 216a is configured to have a high light reflectance, thereby making it possible to more improve brightness and sharpness when representing the color of the rotating balls 120.

Continuously, a color electronic paper display device and a method for manufacturing the same according to another embodiment of the present invention and will be described in detail. Herein, a description overlapping with the color electronic paper display device 200 as described above will be omitted or simplified.

Figure 5:
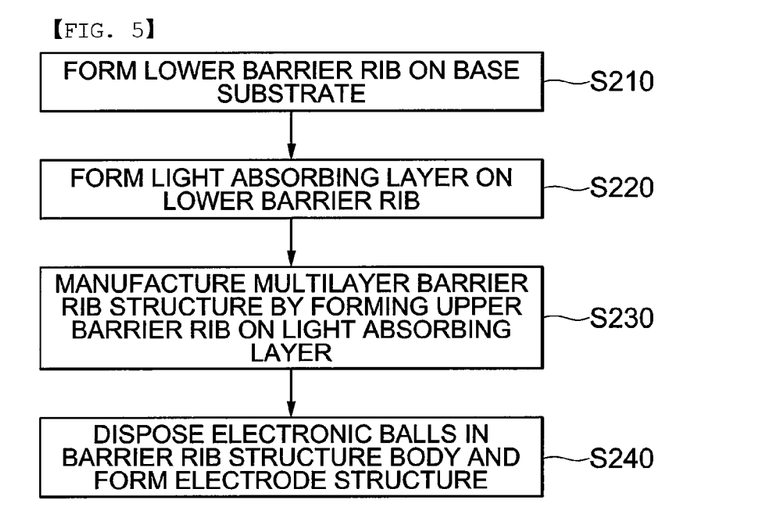
FIG. 5 is a flow chart showing a method for manufacturing a color electronic paper display device according to another embodiment of the present invention.
Figure 6A:
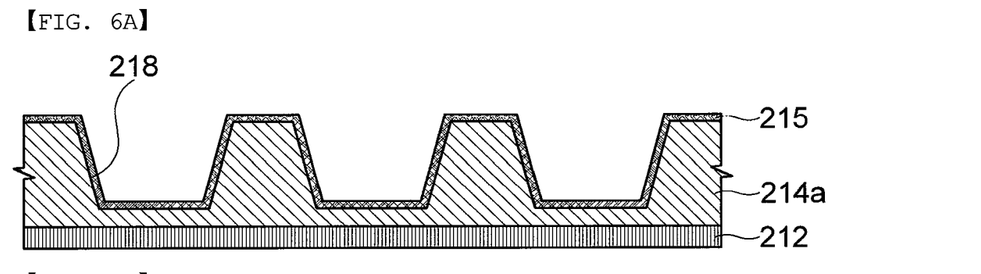
FIGS. 6A to 6C are diagrams explaining processes for manufacturing a color electronic paper display device according to another embodiment of the present invention.
Figure 6B:
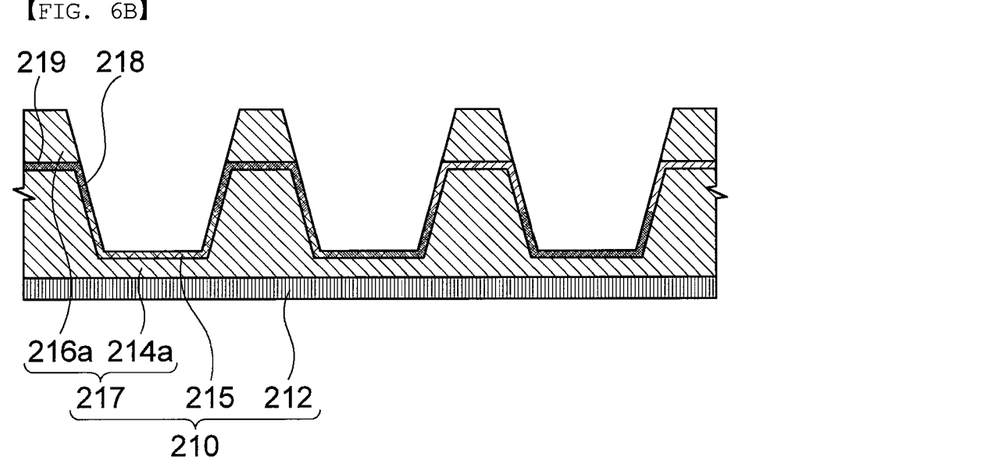
Figure 6C:
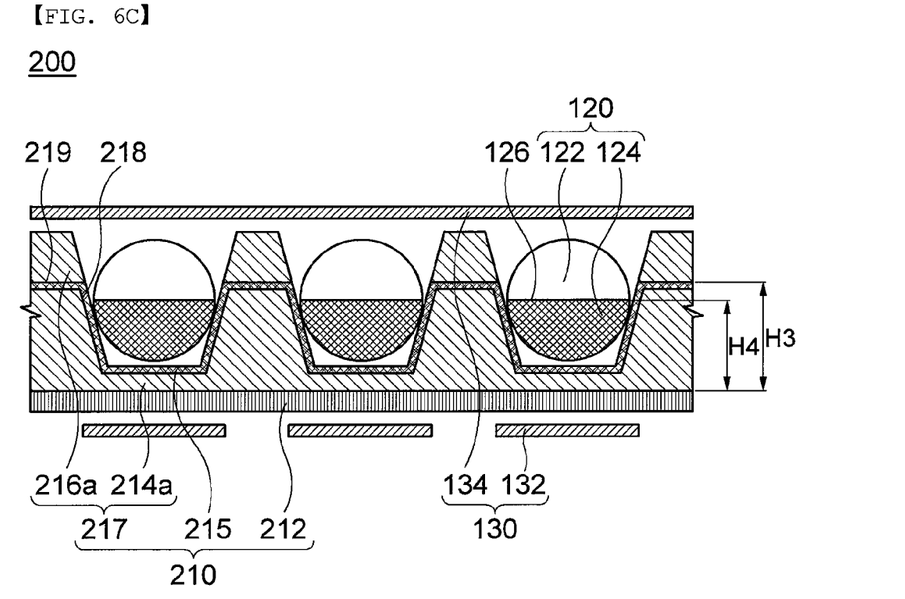

FIG. 5 is a flow chart showing a method for manufacturing a color electronic paper display device according to another embodiment of the present invention. FIGS. 6A to 6C are diagrams explaining processes for manufacturing a color electronic paper display device according to another embodiment of the present invention.

Referring to FIGS. 5 and 6A, a lower barrier rib 214a may be formed on a base substrate 212 (S210). The forming the lower barrier rib 214a may include forming a lower layer on the base substrate 212 and forming a cavity 218 on the lower layer.

A light absorbing layer 215 may be formed on the lower barrier rib 214a (S220). For example, the forming the light absorbing layer 215 may be made by performing a lamination process of attaching a light absorbing film having a higher light absorption than that of the lower barrier rib 214a to the surface of the lower barrier rib 214a. As another example, the forming the light absorbing layer 215 may be made by applying a light absorbing material to the surface of the lower barrier rib 214a, the light absorbing material having a higher light absorption than that of the lower barrier rib 214a.

Referring to FIGS. 5 and 6B, a multilayer barrier rib structure 217 may be manufactured by forming an upper barrier rib 216a on the light absorbing layer 215 (S230). For example, the forming the upper barrier rib 216a may further include forming an upper layer that covers the light absorbing layer 215 and forming a cavity 218 in the upper layer. As another example, the forming the upper barrier rib 216a may be made by selectively forming a film that forms the upper barrier rib 216a on the light absorbing layer 215 in the region where the cavity 218 is not formed. Therefore, it is possible to manufacture the barrier rib structure body 210 including the base substrate 212, the multilayer barrier rib structure 217 formed of the lower barrier rib 214a and the upper barrier rib 216a, and the light absorbing layer 215 formed between the lower and upper barrier ribs 214a and 216a. Herein, the upper barrier rib 216a may be formed to have a relatively higher light reflectivity than that of the light absorbing layer 215. To this end, the upper barrier rib 216a may be made of the same material as that of the lower barrier rib 214a.

Referring to FIGS. 5 and 6C, the rotating balls 120 may be disposed in the barrier rib structure body 210 and an electrode structure 130 may be formed (S240). For example, the rotating balls 120 may be positioned in the cavity 218 of the barrier rib structure body 210. Herein, the rotating balls 120 may be disposed so that the height H4 of the fourth boundary surface 126 between the first and second hemispheres 122 and 124 of the rotating balls 120 is higher than the height H3 of the third boundary surface 219 between the lower and upper barrier ribs 214a and 216a of the barrier rib structure body 210. To this end, during the process of forming the light absorbing layer 215 described with reference to FIG. 6A, the thickness of the lower barrier rib 214a may be controlled so that the height of the upper surface of the light absorbing layer 215 is higher than that of the third boundary surface 219. The forming the electrode structure 130 may include disposing the lower electrode 132 under the barrier rib structure body 210, and disposing the upper electrode 134 over the barrier rib structure body 210.

Meanwhile, after forming the electrode structure 130, filling transparent oil in the cavity 118 of the barrier rib structure body 210 may further be added. For example, injecting the transparent oil into the cavity 118 through an oil inlet provided between the upper and lower electrodes 132 and 134 and sealing the oil inlet may further be added. Therefore, the rotating balls 120 can be easily rotated within the cavity 118 by the transparent oil.

As described above, the color electronic paper display device 200 according to another embodiment of the present invention includes the rotating balls 120 formed of the first and second hemispheres 122 and 124 having different colors and the barrier rib structure body 210 that partitions the rotating balls 120, wherein the barrier rib structure 210 has the light absorbing layer 215 that is configured to cover the color of the other hemisphere, while the color of any one of the first and second hemispheres 122 and 124 is represented. Therefore, the color electronic paper display device 200 according to another embodiment of the present invention prevents the color of the other hemisphere from being represented by the light reflection of the light absorbing layer 215 of the barrier rib structure body 210, while the color is represented by any one of the hemispheres of the rotating balls 120, thereby making it possible to improve color sharpness and contrast ratio of the display device.

Hereinafter, a color electronic paper display device and a method for manufacturing the same according to still another embodiment of the present invention and will be described in detail. Herein, a description overlapping with the color electronic paper display devices 100 and 200 described above will be omitted or simplified.

Figure 7:
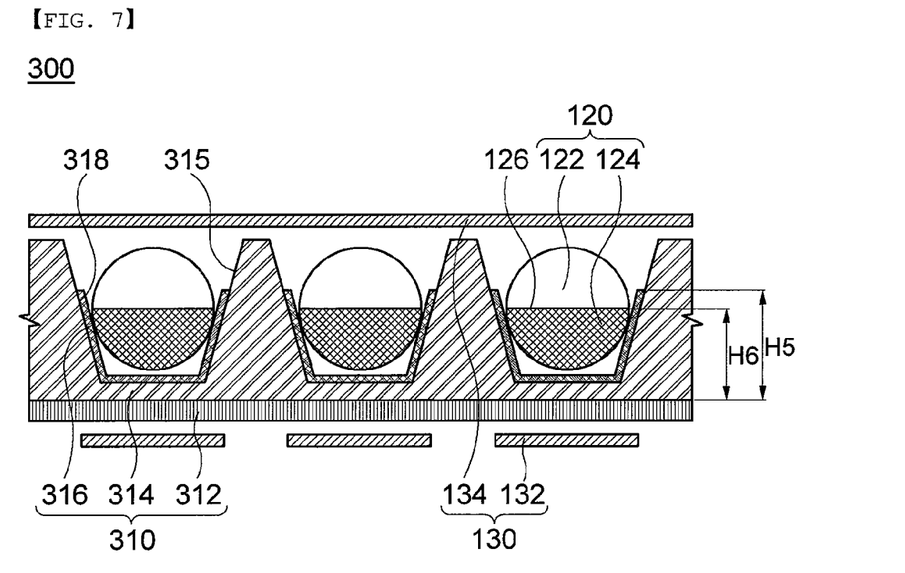
FIG. 7 is a diagram showing a color electronic paper display device according to still another embodiment of the present invention.

FIG. 7 is a diagram showing a color electronic paper display device according to still another embodiment of the present invention. Referring to FIG. 7, a color electronic paper display device 300 may include rotating balls 120, an electrode structure 130, and a barrier rib structure body 310.

The barrier rib structure body 310 may include a base substrate 312, a barrier rib structure 314, and a light absorbing layer 316. The barrier rib structure 314 may be disposed on the base substrate 312 and may have a cavity 318 for partitioning the rotating balls 120. The light absorbing layer 316 may cover the surface of the barrier rib structure 314. Herein, the light absorbing layer 316 may be selectively formed on the surface of the barrier rib structure 314 within the cavity 318. The light absorbing layer 316 may have a higher light absorption rather than that of the barrier rib structure 314. For example, the light absorbing layer 316 may include a pigment having a relatively lower lightness than that of the barrier rib structure 314.

Meanwhile, the side surfaces of the barrier rib structure 314 within the cavity 318 opposite to the rotating balls 120 may be divided into a light reflective layer 315 and a light absorbing layer 316 by the light absorbing layer 316. For example, the light absorbing layer 316 may cover only a predetermined height of the side surfaces from the bottom surface of the cavity 318. Therefore, the side surfaces of the barrier rib structure within the cavity 318 opposite to the rotating balls 120 may be divided into an exposed upper side surface of the barrier rib structure 314 and a lower side surface thereof covered by the light absorbing layer 316. The exposed upper side surface of the barrier rib structure 314 within the cavity 318 may be the light reflective layer 135. Herein, a height H5 of a boundary surface between the light reflective layer 315 and the light absorbing layer 316 may be equal to or higher than a height H6 of a boundary surface 216 between the first and second hemispheres 122 and 124 of the rotating balls 120.

While any one of the first and second hemispheres 122 and 124 is positioned to face the upper portion, the barrier rib structure body 310 having the above configuration may be configured so that another hemisphere facing the lower portion is completely surrounded by the light absorbing layer 316. In this case, while the first hemisphere 122 represents color to the outside, the second hemisphere 124 is surrounded by the light absorbing layer 316. At this time, the light reflected from the second hemisphere 124 may be absorbed by the light absorbing layer 316. Therefore, the barrier rib structure 314 is configured so that the height H5 of the upper surface of the light absorbing layer 316 is equal to or higher than the height H6 of the boundary surface 126 between the first and second hemispheres 122 and 124, thereby making it possible to prevent the color of the other hemisphere from being represented to the outside, while the color of any one of the first and second hemispheres 122 and 124 is represented.

In addition, while the first hemisphere 122 represents the color to the outside, the light reflected from the first hemisphere 122 to face the barrier rib structure 314 may be reflected by the light reflective layer 315 to face the outside. Herein, the barrier rib structure 314 is configured to have a high light reflectance, such that the light is effectively reflected by the light reflective layer 315 to face the outside, thereby making it possible to more improve brightness and sharpness when the rotating balls 120 represent colors.

Continuously, a method for manufacturing a color electronic paper display device according to still another embodiment of the present invention and will be described in detail. Herein, a description overlapping with the color electronic paper display device 300 described above will be omitted or simplified.

Figure 8:
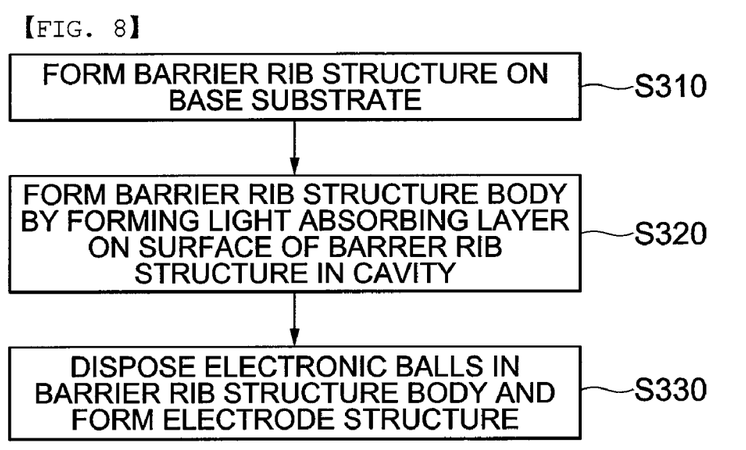
FIG. 8 is a flow chart showing a method for manufacturing a color electronic paper display device according to still another embodiment of the present invention.
Figure 9A:
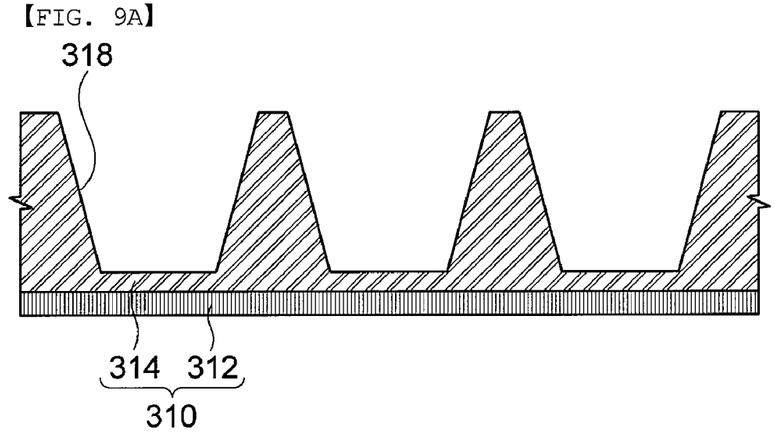
FIGS. 9A to 9C are diagrams explaining processes for manufacturing a color electronic paper display device according to still another embodiment of the present invention.
Figure 9B:
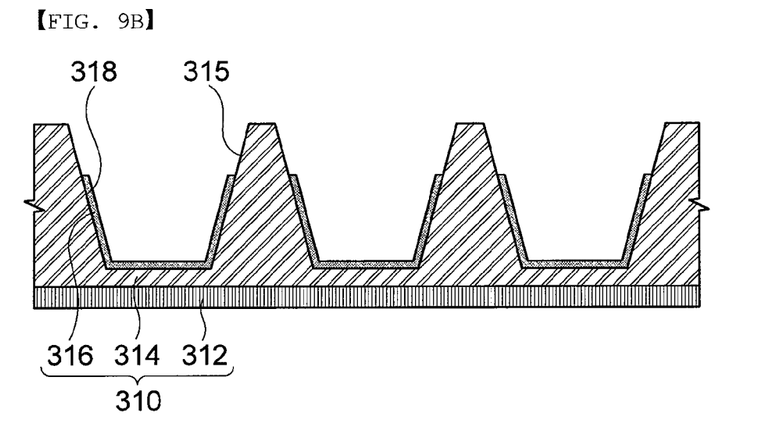
Figure 9C:
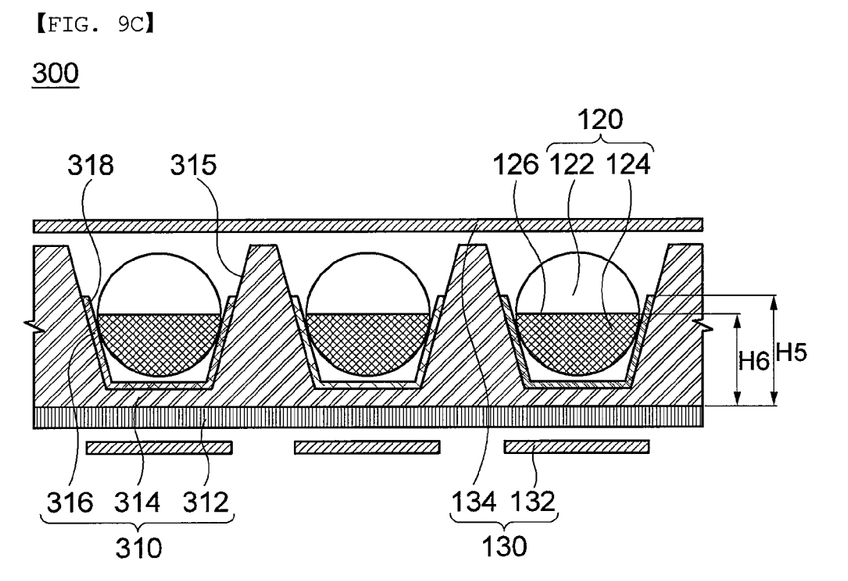

FIG. 8 is a flow chart showing a method for manufacturing a color electronic paper display device according to still another embodiment of the present invention. FIGS. 9A to 9C are diagrams explaining processes for manufacturing a color electronic paper display device according to still another embodiment of the present invention.

Referring to FIGS. 8 and 9A, a barrier rib structure 314 may be formed on a base substrate 312 (S310). For example, the forming the barrier rib structure 314 may include forming a barrier rib forming layer on the base substrate 312 and forming a cavity 318 in the barrier rib forming layer. The forming the barrier rib forming layer may be made by performing a lamination process of attaching light reflection films having a relatively higher light reflectance to the base substrate 312. As another example, the forming the barrier rib forming layer may be made by applying a light reflection material having a relative higher reflectivity onto the base substrate 312.

Referring to FIGS. 8 and 9B, the barrier rib structure body 310 may be formed by forming a light absorbing layer 316 on the surface of the barrier rib structure 314 within the cavity 318 (S320). For example, a light absorbing film that conformally covers the barrier rib structure 314 may be formed. The forming the light absorbing film may be made by performing any one of a physical vapor deposition (PVD) process, a chemical vapor deposition (CVD) process, a spray coating deposition process, and a dip coating deposition process. The light absorbing film in the rest region may be removed, while maintaining the light absorbing film within the cavity 318. The selective removal of the light absorbing film may be made by performing an ultrasonic cleaning and various kinds of dry or wet etching processes. Therefore, the upper side surfaces of the barrier rib structure 314 within the cavity 318 may be exposed and the lower side surfaces may be covered by the light absorbing layer 316. The upper side surfaces may be used as a light reflective layer 315.

Referring to FIGS. 8 and 9C, the rotating balls 120 may be disposed in the barrier rib structure body 310 and an electrode structure 130 may be formed (S330). For example, the rotating balls 120 may be positioned in the cavity 318 of the barrier rib structure body 310. Herein, the rotating balls 120 may be disposed so that the height H5 of the boundary surface between the light absorbing layer 316 of the barrier rib structure body 310 and the light reflective layer 315 of the exposed barrier rib structure 314 within the cavity 318 is higher than the height H6 of the second boundary surface 126 between the first and second hemispheres 122 and 124 of the rotating balls 120. The forming the electrode structure 130 may include disposing a lower electrode 132 under the barrier rib structure body 310, and disposing an upper electrode 134 over the barrier rib structure body 310.

According to the present invention, the color electronic paper display device includes the rotating balls formed of hemispheres having different colors and the barrier rib structure body that partitions the rotating balls, wherein the barrier rib structure body has the light absorbing layer that covers the color of the other hemisphere, while the color of any one of the hemispheres is represented. Therefore, the color electronic paper display device prevents the color of the other hemisphere from being represented by the light reflection of the barrier rib structure body, while the color is represented by any one of the hemispheres of the rotating balls, thereby making it possible to improve color sharpness and contrast ratio of the display device.

According to the present invention, the method for manufacturing a color electronic paper display device can manufacture the color electronic paper display device that includes the rotating balls formed of hemispheres having different colors and the barrier rib structure body that partitions the rotating balls, wherein the barrier rib structure body has the light absorbing layer that covers the color of the other hemisphere, while the color of any one of the hemispheres is represented. Therefore, the method for manufacturing a color electronic paper display device can manufacture the color electronic paper display device that improves color sharpness and contrast ratio by preventing the color of the other hemisphere from being represented by the light reflection of the barrier rib structure body, while the color is represented by any one of the hemispheres of the rotating balls.

The present invention has been described in connection with what is presently considered to be practical exemplary embodiments. Although the exemplary embodiments of the present invention have been described, the present invention may be also used in various other combinations, modifications and environments. In other words, the present invention may be changed or modified within the range of concept of the invention disclosed in the specification, the range equivalent to the disclosure and/or the range of the technology or knowledge in the field to which the present invention pertains. The exemplary embodiments described above have been provided to explain the best state in carrying out the present invention. Therefore, they may be carried out in other states known to the field to which the present invention pertains in using other inventions such as the present invention and also be modified in various forms required in specific application fields and usages of the invention. Therefore, it is to be understood that the invention is not limited to the disclosed embodiments. It is to be understood that other embodiments are also included within the spirit and scope of the appended claims.

What is claimed is:

1. A color electronic paper display device, comprising:
    a barrier rib structure body that has a cavity partitioning rotating balls; and
    an electrode structure that is provided in the barrier rib structure body and applies voltage to the rotating balls,
    wherein the barrier rib structure body has a multilayer barrier rib structure formed of a lower barrier rib and an upper barrier rib, having different light absorptions.

2. The color electronic paper display device according to claim 1, wherein the multilayer barrier rib structure includes:
    a lower barrier rib; and
    an upper barrier rib that is disposed on the lower barrier rib and has a relatively higher light reflectance than that of the lower barrier rib.

3. The color electronic paper display device according to claim 1, wherein the lower barrier rib includes a light absorbing layer that absorbs light, and the upper barrier rib includes a light reflective layer that reflects the light.

4. The color electronic paper display device according to claim 1, wherein the lower barrier rib includes a pigment having a lower lightness than that of the upper barrier rib.

5. The color electronic paper display device according to claim 1, wherein each of the rotating balls is configured of first and second hemispheres electrified with different charges, and the height of the boundary surface between the lower barrier rib and the upper barrier rib is equal to or higher than the height of the boundary surface between the first and second hemispheres.

6. The color electronic paper display device according to claim 1, wherein each of the rotating balls is configured of first and second hemispheres electrified with different charges, and the lower barrier rib is configured to surround any one of the first and second hemispheres.

7. The color electronic paper display device according to claim 1, wherein each of the rotating balls is configured of first and second hemispheres electrified with different charges, the lower barrier rib absorbs the light reflected from any one of the first and second hemispheres, and the upper barrier rib reflects the light reflected from the other of the first and second hemispheres.

8. The color electronic paper display device according to claim 1, wherein the light absorbing layer is formed by laminating a plurality of light absorbing films.

9. A method for manufacturing a color electronic paper display device, comprising:
    forming a light absorbing layer;
    forming a light reflective layer on the light absorbing layer;
    forming a multilayer barrier rib structure having a lower barrier rib and an upper barrier rib by forming a cavity in the light reflective layer and the light absorbing layer;
    disposing rotating balls in the cavity; and
    forming an electrode structure that applies voltage to the rotating balls in the multilayer barrier rib structure.

10. The method for manufacturing a color electronic paper display device according to claim 9, further comprising:
    preparing a base substrate that supports the multilayer barrier rib structure,
    wherein the forming the light absorbing layer includes laminating a plurality of light absorbing films to the base substrate.

11. The method for manufacturing a color electronic paper display device according to claim 9, wherein the rotating balls are formed of first and second hemispheres electrified with different charges, having different colors, and the disposing the rotating balls in the cavity includes positioning the rotating balls in the cavity so that the height of the boundary surface between the lower barrier rib and the upper barrier rib is equal to or higher than the height of the boundary surface between the first and second hemispheres.

12. The method for manufacturing a color electronic paper display device according to claim 9, wherein the rotating balls are formed of first and second hemispheres electrified with different charges, having different colors, and the forming the light absorbing layer controls the relative thickness of the light absorbing layer and the light reflective layer so that the height of the boundary surface between the lower barrier rib and the upper barrier rib is equal to or higher than the height of the boundary surface between the first and second hemispheres.

13. A color electronic paper display device, comprising:
    a barrier rib structure body that has a cavity partitioning rotating balls; and an electrode structure that is provided in the barrier rib structure body and applies voltage to the rotating balls,
wherein the barrier rib structure body includes:
a lower barrier rib;
an upper barrier rib that is disposed on the lower barrier rib; and
a light absorbing layer that covers the lower barrier rib exposed to the cavity and partially surrounds the rotating ball.

14. The color electronic paper display device according to claim 13, wherein the light absorbing layer includes a portion interposed between the lower barrier rib and the upper barrier rib.

15. The color electronic paper display device according to claim 13, wherein the light absorbing layer includes a pigment having a lower lightness than that of the lower barrier rib and the upper barrier rib.

16. The color electronic paper display device according to claim 13, wherein the upper barrier rib is used as a light reflective layer that reflects light from the rotating balls to the outside.

17. The color electronic paper display device according to claim 13, wherein each of the rotating balls is configured of hemispheres electrified with different charges, and the height of the boundary surface between the lower barrier rib and the upper barrier rib is equal to or higher than the height of the boundary surface between the hemispheres.

18. The color electronic paper display device according to claim 13, wherein the lower barrier rib and the upper barrier rib are made of the same material.

19. A method for manufacturing a color electronic paper display device, comprising:
forming a lower barrier rib that has a cavity partitioning rotating balls;
forming a light absorbing layer that covers the lower barrier rib;
forming an upper barrier rib that shares the cavity on the lower barrier rib other than the region where the cavity is formed;
disposing rotating balls in the cavity; and
forming an electrode structure that applies voltage to the rotating balls in a barrier rib structure body.

20. The method for manufacturing a color electronic paper display device according to claim 19, further comprising:
preparing a base substrate that supports the barrier rib structure body,
wherein the forming the light absorbing layer further includes laminating a plurality of light absorbing films to the lower barrier rib.

21. The method for manufacturing a color electronic paper display device according to claim 19, wherein the rotating balls are formed of first and second hemispheres electrified with different charges, having different colors, and the disposing the rotating balls in the cavity includes positioning the rotating balls in the cavity so that the height of the boundary surface between the lower barrier rib and the upper barrier rib is equal to or higher than the height of the boundary surface between the first and second hemispheres.

22. The method for manufacturing a color electronic paper display device according to claim 19, wherein the rotating balls are formed of first and second hemispheres electrified with different charges, having different colors, and the forming the light absorbing layer controls the region of the cavity, where the light absorbing layer is formed, so that the height of the boundary surface between the lower barrier rib and the upper barrier rib is equal to or higher than the height of the boundary surface between the first and second hemispheres.

23. The method for manufacturing a color electronic paper display device according to claim 19, wherein the lower barrier rib and the upper barrier rib are made of the same material.

24. A method for manufacturing a color electronic paper display device, comprising:
forming a barrier rib structure having a cavity partitioning rotating balls;
forming a light absorbing layer that covers the barrier rib structure;
removing the light absorbing layer in the rest region of the cavity, while maintaining the light absorbing layer in the cavity;
positioning the rotating balls in the cavity; and
forming an electrode structure that applies voltage to the rotating balls.

25. The method for manufacturing a color electronic paper display device according to claim 24, wherein the forming the light absorbing layer includes laminating light absorbing films to the barrier rib structure.

26. The method for manufacturing a color electronic paper display device according to claim 24, wherein the removing the light absorbing layer allows the lower side surface of the barrier rib structure in the cavity to be covered by the light absorbing layer and the upper side surface of the barrier rib structure to be exposed.

27. The method for manufacturing a color electronic paper display device according to claim 24, wherein the positioning the rotating balls in the cavity includes positioning the rotating balls in the cavity so that the height of the boundary surface between the light absorbing layer and the upper side surface of the cavity is equal to or higher than the height of the boundary surface between the first and second hemispheres.

28. The method for manufacturing a color electronic paper display device according to claim 24, wherein the rotating balls are formed of first and second hemispheres electrified with different charges, having different colors, and the removing the light absorbing layer defines the region where the light absorbing layer is formed so that the light absorbing layer surrounds any one of the first and second hemispheres.

* * * * *